United States Patent [19]
Han

[11] Patent Number: 5,933,200
[45] Date of Patent: Aug. 3, 1999

[54] METHOD FOR REDUCING CARRIER RECOVERY TIME IN HIGH DEFINITION TELEVISION RECEIVER

[75] Inventor: Dong-Suck Han, Ahnyang, Rep. of Korea

[73] Assignee: Samsung Electronics Co., Ltd., Kyungki-do, Rep. of Korea

[21] Appl. No.: 08/941,396

[22] Filed: Sep. 30, 1997

[30] Foreign Application Priority Data

Oct. 21, 1996 [KR] Rep. of Korea ..................... 96-47193

[51] Int. Cl.⁶ ................................................. H04L 27/06
[52] U.S. Cl. ..................... 348/725; 455/192.3; 375/344
[58] Field of Search ..................... 348/725, 731, 348/735, 726, 732, 733; 455/182.1, 182.2, 183.1, 183.2, 192.1, 192.2, 196.1, 197.1, 264, 265, 255, 257, 258, 259, 182.3, 192.3, 316, 317; 375/344

[56] References Cited

U.S. PATENT DOCUMENTS

| | | | |
|---|---|---|---|
| 4,392,249 | 7/1983 | Matsuura et al. | 455/164 |
| 4,547,805 | 10/1985 | Baker et al. | 358/195.1 |
| 4,575,761 | 3/1986 | Carlson et al. | 358/191.1 |
| 4,581,643 | 4/1986 | Carlson | 358/191.1 |
| 4,652,834 | 3/1987 | McAdam | 329/50 |
| 5,241,687 | 8/1993 | Short | 455/45 |
| 5,311,318 | 5/1994 | Dobrovolny | 348/731 |
| 5,574,998 | 11/1996 | Andoh | 455/182.2 |
| 5,697,089 | 12/1997 | Lundqvist et al. | 455/315 |
| 5,724,105 | 3/1998 | Hatano | 348/725 |
| 5,740,205 | 4/1998 | Baum et al. | 375/344 |
| 5,809,088 | 9/1998 | Han | 375/344 |
| 5,828,954 | 10/1998 | Wang | 455/260 |

*Primary Examiner*—Andrew I. Faile
*Assistant Examiner*—Uyen Le
*Attorney, Agent, or Firm*—Sughrue, Mion, Zinn, Macpeak & Seas, PLLC

[57] ABSTRACT

An HDTV receiver with a reduced carrier recovery time in a communication system transmitting a carrier via a pilot signal is disclosed. The HDTV receiver includes a double conversion tuner and a carrier recovery circuit for recovering a carrier. The carrier recovery circuit determines a fast response pull-in frequency range at which a frequency offset can be speedily removed during detecting the pilot signal in the carrier. If the frequency offset detected by the carrier recovery circuit falls within the pull-in range in the speed response range, a first local oscillation frequency of the double conversion tuner is changed step-by-step so as to minimize the detected frequency offset.

10 Claims, 8 Drawing Sheets

METHOD FOR REDUCING CARRIER RECOVERY TIME IN HIGH DEFINITION TELEVISION RECEIVER

BACKGROUND OF THE INVENTION

1. Field of the Invention

The present invention relates to a high definition television (HDTV) and more particularly to a method for reducing a carrier recovery time in a HDTV receiver. This application for a method for reducing carrier recovery time in HDTV is based on Korean Patent Application No. 47193/1996 which is incorporated by reference herein for all purposes.

2. Description of the Related Art

In VSB (Vestigial Side Band), DSB (Double Side Band), and SSB (Single Side Band) communication systems, a transmitter transmits a carrier via a pilot signal, in order for a receiver to accurately recover the carrier.

An HDTV receiver detects and demodulates the pilot signal, in order to recover the carrier. However, if there is a big difference between a pilot frequency of the received pilot signal and a local oscillation frequency of a demodulator, it takes a very long time to fully recover the carrier. The higher an offset frequency of the carrier (i.e., the difference between the pilot frequency and the local oscillator frequency) becomes, the lower an output of a frequency error detector becomes. Accordingly, in order to reduce a frequency error, it takes a long carrier recovery time. Therefore, in order to reduce the carrier recovery time, it is needed to detect an extent of the frequency offset and to recover the carrier based upon the detection of the extent of the frequency offset.

SUMMARY OF THE INVENTION

It is an object of the present invention to provide a method for reducing a carrier recovery time in a communication system transmitting a carrier via a pilot signal.

It is another object of the present invention to provide a method for reducing a carrier frequency error of a carrier recovery circuit in an HDTV receiver.

According to one aspect of the present invention, a high definition television receiver (which includes a double conversion tuner and a carrier recovery circuit for recovering a carrier) determines a speed response pull-in frequency range at which a frequency offset can be speedily removed during detecting a pilot signal in the carrier; and changes a first local oscillation frequency of the double conversion tuner step-by-step so as to minimize the detected frequency offset, if the frequency offset detected by the carrier recovery circuit falls within the determined speed response pull-in frequency range.

BRIEF DESCRIPTION OF THE DRAWINGS

The above and other objects, features and advantages of the present invention will become more apparent in the light of the following detailed description of an exemplary embodiment thereof taken with the attached drawings in which.

DETAILED DESCRIPTION OF THE PREFERRED EMBODIMENT

Figure 1:
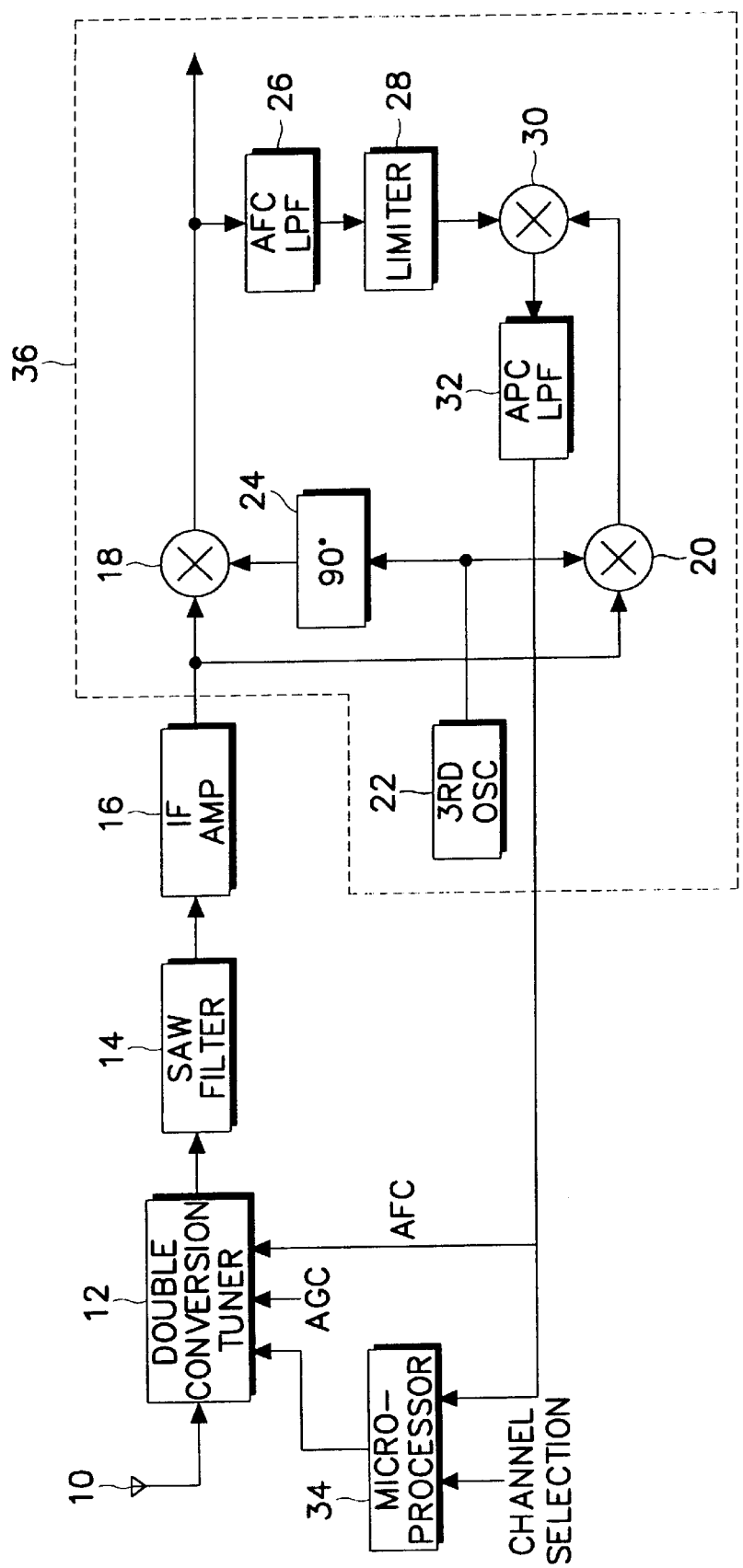
FIG. 1 is a block diagram of an HDTV receiver with a carrier recovery circuit according to an embodiment of the present invention.

A preferred embodiment of the present invention will be described in detail hereinbelow with reference to the attached drawings, in which the like reference numerals represent the like elements. Further, it should be clearly understood that many specifics such as the detailed circuit elements are shown only by way of an example to bring a better understanding of the present invention and the present invention may be embodied without the specifics. Moreover, it should be noted that detailed descriptions on the related prior art have been omitted if it is believed to be unnecessary in describing the concepts of the present invention.

FIG. 1 illustrates an HDTV receiver with a carrier recovery circuit 36, in which a radio frequency signal received from an antenna 10 is converted by a double conversion tuner 12 into an intermediate frequency signal of about 44 MHz.

Figure 2:
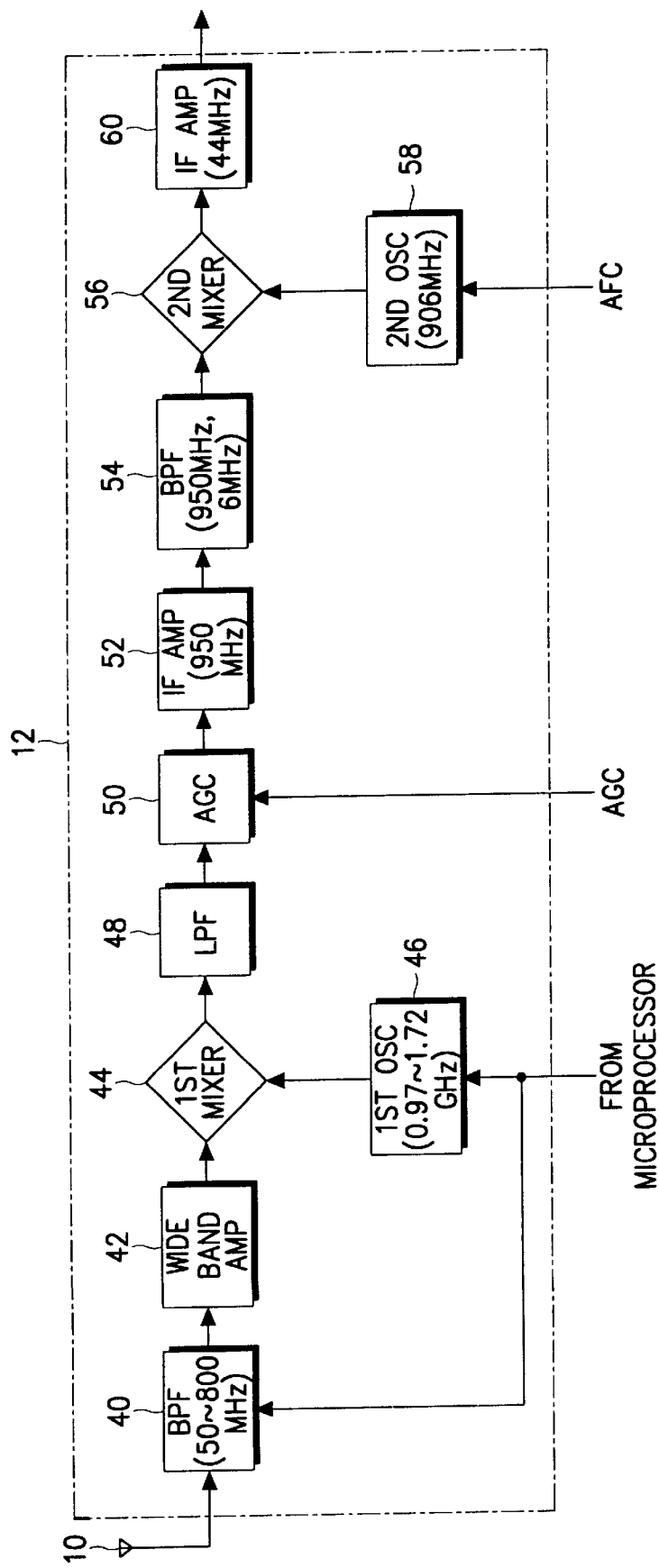
FIG. 2 is a detailed block diagram of a double conversion tuner shown in FIG. 1.
Figure 8:
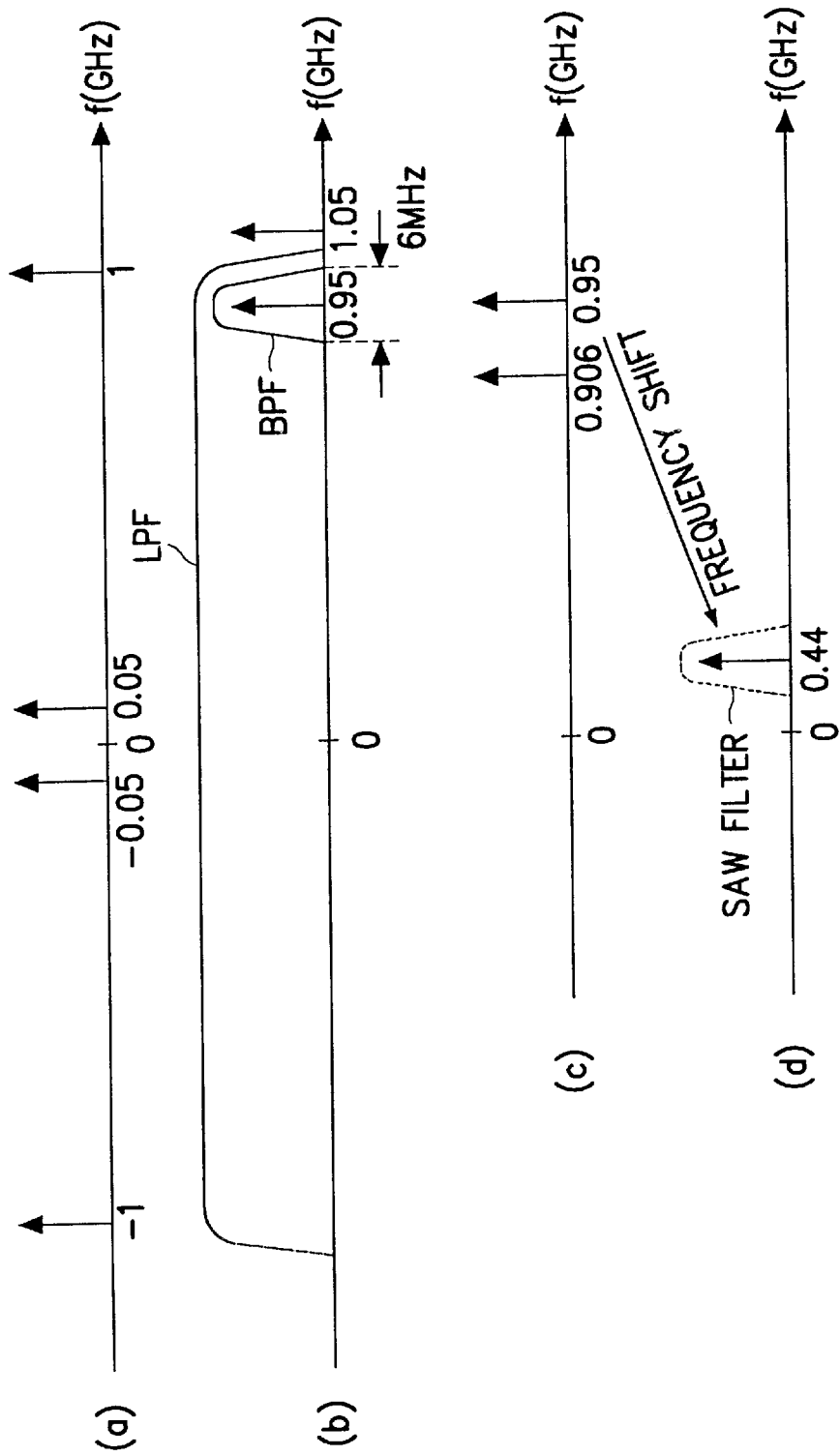
FIG. 8 is a diagram for explaining a frequency down-conversion operation of the double conversion tuner in the HDTV receiver according to an embodiment of the present invention.

FIG. 2 illustrates a detailed block diagram of the double conversion tuner 12. As illustrated, upon power-up, a microprocessor 34 of FIG. 1 provides a control signal to a first local oscillator 46 in the double conversion tuner 12 to generate a first local oscillation frequency of 1 GHz, as shown in spectral representation (a) of FIG. 8. For example, if a user selects a particular channel, the first local oscillator 46 generates the local oscillation frequency of 1 GHz to tune the system to the particular channel, under the control of the microprocessor 34. The received signal (for example, 50 MHz as shown in spectral representation (a) of FIG. 8) is applied to a first mixer 44 through the antenna 10, a bandpass filter 40 with a pass band of 50–800 MHz, and a wide-band amplifier 42. A frequency band of the received signal is shifted by the first mixer 44 based on the local oscillation signal generated from the first local oscillator 46. A low-pass filter 48 with a pass band of −1 GHz~1 GHz filters the signal output from the first mixer 44 to generate an intermediate frequency of 950 MHz and 1050 MHz. The intermediate frequency generated from the low-pass filter 48 is transferred to a second mixer 56 through an automatic gain controller (AGC) 50, an intermediate frequency amplifier (IF AMP) 52, and a bandpass filter 54 with tod a bandwidth of 6 MHz centered on 950 MHz, as shown in spectral representation (b) of FIG. 8. The second mixer 56 mixes the 950 MHz intermediate frequency output from the bandpass filter 54 with a second local oscillation frequency of 906 MHz, shown in spectral representation (c) of FIG. 8, generated from a second local oscillator 58, to shift the 950 MHz intermediate frequency to an intermediate frequency of 44 MHz (950 MHz −906 MHz=44 MHz). The 44 MHz intermediate frequency output from the second mixer 56 is transferred to a surface acoustic wave (SAW) filter 14 through an intermediate frequency filter 60.

In the meantime, a frequency offset may be caused by non-ideal characteristics of the double conversion tuner 12, and the first, second, and third local oscillators 46, 58, and 22. In order to get rid of the frequency offset, the carrier recovery circuit 36 controls a local oscillation frequency of the second local oscillator 58 of the double conversion tuner 12. In this manner, the receiver may properly recover the carrier.

Referring back to FIG. 1, the SAW filter 14 filters the intermediate frequency signal generated from the double conversion tuner 12 to remove signals on adjacent channels. The bandpass-filtered signal output from the SAW filter 14 is amplified by an intermediate frequency amplifier 16 and applied to the carrier recovery circuit 36 for recovering a received carrier. The carrier recovery circuit 36 includes mixers 18 and 20, a third local oscillator 22, a phase shifter 24, an automatic frequency control low-pass filter (AFC LPF) 26, a limiter 28, a multiplier 30, and an automatic phase control low-pass filter (APC LPF) 32.

In operation, the IF signal output from the IF amplifier 16 is commonly applied to the mixers 18 and 20. A third oscillation frequency generated from the third local oscillator 22 is applied to the mixer 20 and the phase shifter 24. The phase shifter 24 shifts a phase of the third local oscillation frequency by 90° and transfers the 90° phase-shifted local oscillation frequency to the mixer 18. The mixer 18 mixes the IF signal from the IF amplifier 16 with the 90° phase-shifted local oscillation frequency to generate a real signal and the mixer 20 mixes the IF signal with the local oscillation frequency from the third local oscillator 22 to generate an imaginary signal.

An HDTV signal includes a pilot signal for assisting the receiver in recovering the carrier, and the automatic frequency control low-pass filter 26 detects a frequency difference between a frequency of the pilot signal and the local oscillation frequency generated from the third local oscillator 22. If the detected frequency difference is not greater than a predetermined value, the limiter 28 will generate a constant value of either +1 or −1, thereby signifying that the carrier does not have the frequency offset. However, if the detected frequency difference is greater than the predetermined value, the limiter 28 will alternately generate +1 and −1 values, thereby signifying that the carrier has the frequency offset.

In case that the carrier has the frequency offset, the multiplier 30 multiplies the signal output from the limiter 28 by the imaginary signal output from the mixer 20. The automatic phase control low-pass filter 32 filters the signal output from the multiplier 30 to generate an automatic frequency control signal AFC for correcting the frequency error. The double conversion tuner 12 compensates for the frequency offset by using the automatic frequency control signal AFC.

However, in case that the carrier does not have the frequency offset, the limiter 28 constantly generates the value +1 or −1. At this time, the multiplier 30 functions as a phase detector. In such a case, since the multiplier 30 transfers the signal output from the mixer 20 directly to the automatic phase control low-pass filter 32, the carrier recovery circuit 36 functions as a phase locked loop (PLL). Therefore, the multiplier 30 applies a signal for correcting the phase error to the double conversion tuner 12 through the automatic phase control low-pass filter 32.

In other words, the carrier recovery circuit 36 detects the frequency offset between the carrier signal and the demodulated signal, and functions as a loop for correcting the frequency error by using the detected frequency offset. After completion of correcting the frequency offset, the carrier recovery circuit 36 functions as a phase locked loop for correcting the phase error. Further, the second local oscillator 58 in the double conversion tuner 12 is controlled by the automatic frequency control signal AFC generated from the automatic phase control low-pass filter 32 of the carrier recovery circuit 36.

However, since only the second local oscillator 58 is controllable, it may take a long time to completely recover the carrier, in the case that there is a great difference between the pilot frequency and the local oscillation frequency from the demodulator. Further, as the frequency offset becomes higher and exceeds a particular range, an output of a frequency error detector (i.e., the automatic frequency control low-pass filter 26) becomes smaller. This results in reducing the output of the automatic phase control low-pass filter 32.

Figure 7:
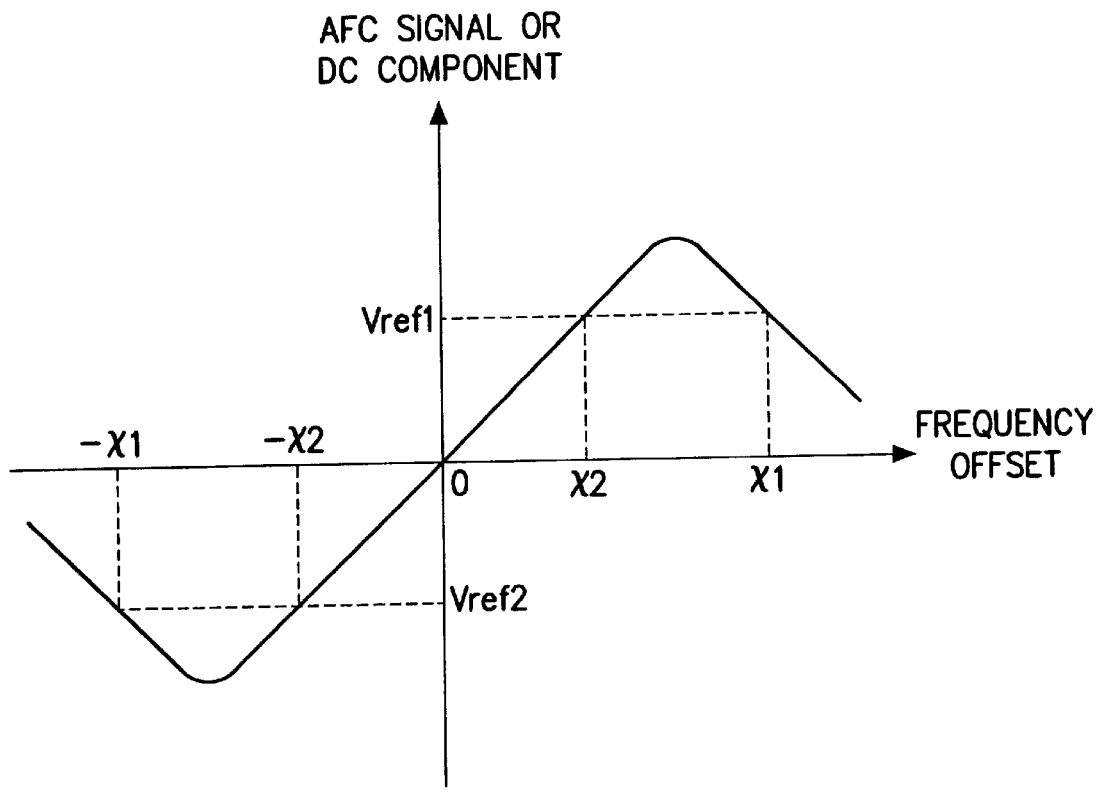
FIG. 7 is a diagram showing an AFC signal level or a DC level of the AFC signal with respect to the speed response pull-in ranges −x1~−x2 and x1~x2.

FIG. 7 illustrates a characteristic curve expressing the AFC signal output of the automatic phase control low-pass filter 32 with respect to the frequency offset, in which the AFC signal draws an S-shaped curve centering on a zero. That is, it is noted from the characteristic curve that the AFC signal output of the automatic phase control low-pass filter 32 begins to decrease, if the frequency offset value exceeds a predetermined range. In this case, it may take a long time to reduce the frequency error.

The HDTV receiver according to the present invention determines a range of frequencies called a speed response pull-in range within which the frequency offset of the carrier can be speedily removed, under the control of the microprocessor 34. As a result, if the detected frequency offset falls within the speed response pull-in range of frequencies, the first local oscillator 46 in the double conversion tuner 12 changes the first local oscillation frequency output step-by-step to speedily remove (or minimize) the frequency offset.

Figure 6:
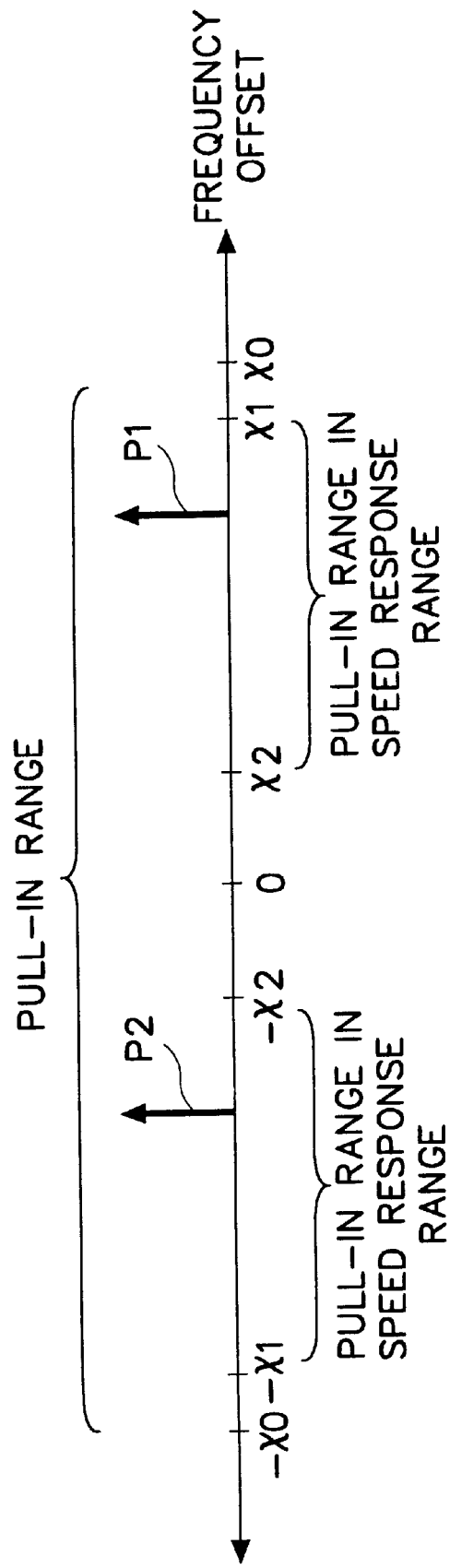
FIG. 6 is a diagram showing speed response pull-in ranges −x1~−x2 and x1~x2 within the pull-in range, according to an embodiment of the present invention.

Referring to FIG. 6, a pull-in range −x0~x0 represents a frequency offset range within which the carrier can be recovered. The pull-in ranges −x1~−x2 and x1~x2, which are in the speed response range, represent frequency offset ranges at which the carrier can be speedily recovered under the control of the microprocessor 34 according to the present invention. These are the speed response pull-in ranges.

Referring to FIG. 7, illustrated is the AFC signal level or a DC level of the AFC signal with respect to the speed response pull-in ranges −x1~−x2 and x1~x2, in which the frequency offset range x1~x2 is determined by a first reference voltage Vref1, and the frequency offset range −x1~−x2 is determined by a second reference voltage Vref2. It is prefer that the values x2 and −x2 in the frequency offset ranges −x1~−x2 and x1~x2 are 100 kHz and −100 kHz, respectively. Further, the values −x1 and x1 may have the maximum limit values −x0 and x0, respectively, of the pull-in range.

Figure 4:
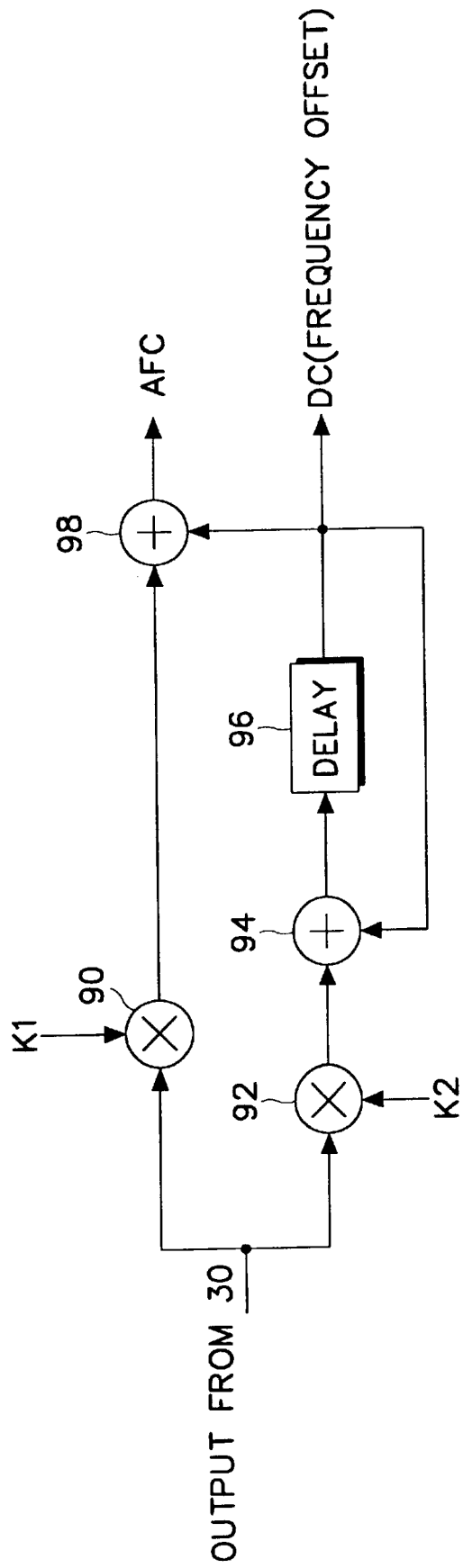
FIG. 4 is a detailed diagram of an automatic phase control low-pass filter (APC LPF) shown in FIGS. 1 and 3.

The microprocessor 34 receives the AFC signal or the DC of the AFC signal from the automatic phase control low-pass filter 32. Referring to FIG. 4, the automatic frequency control low-pass filter 32 includes a DC component path for passing a DC component output therethrough and an AC component path for passing an AC component output therethrough, in which K1 and K2 represent gain constants for determining a characteristic of a carrier recovery loop. The DC component path is composed of a multiplier 92 for multiplying the output of the multiplier 30 by the gain constant K2, an adder 94 for adding an output of the multiplier 92 to an output of a delay 96, and the delay 96 for delaying an output of the adder 94. The DC component output represents an extent of the frequency offset. The AC component path is composed of a multiplier 90 for multiplying the output from the multiplier 30 by the gain constant K1. An adder 98 adds the DC component to the AC component, to generate the automatic frequency control signal AFC. The DC component is information used for correcting the frequency offset, and the AC component is information used for correcting the phase.

Figure 5:
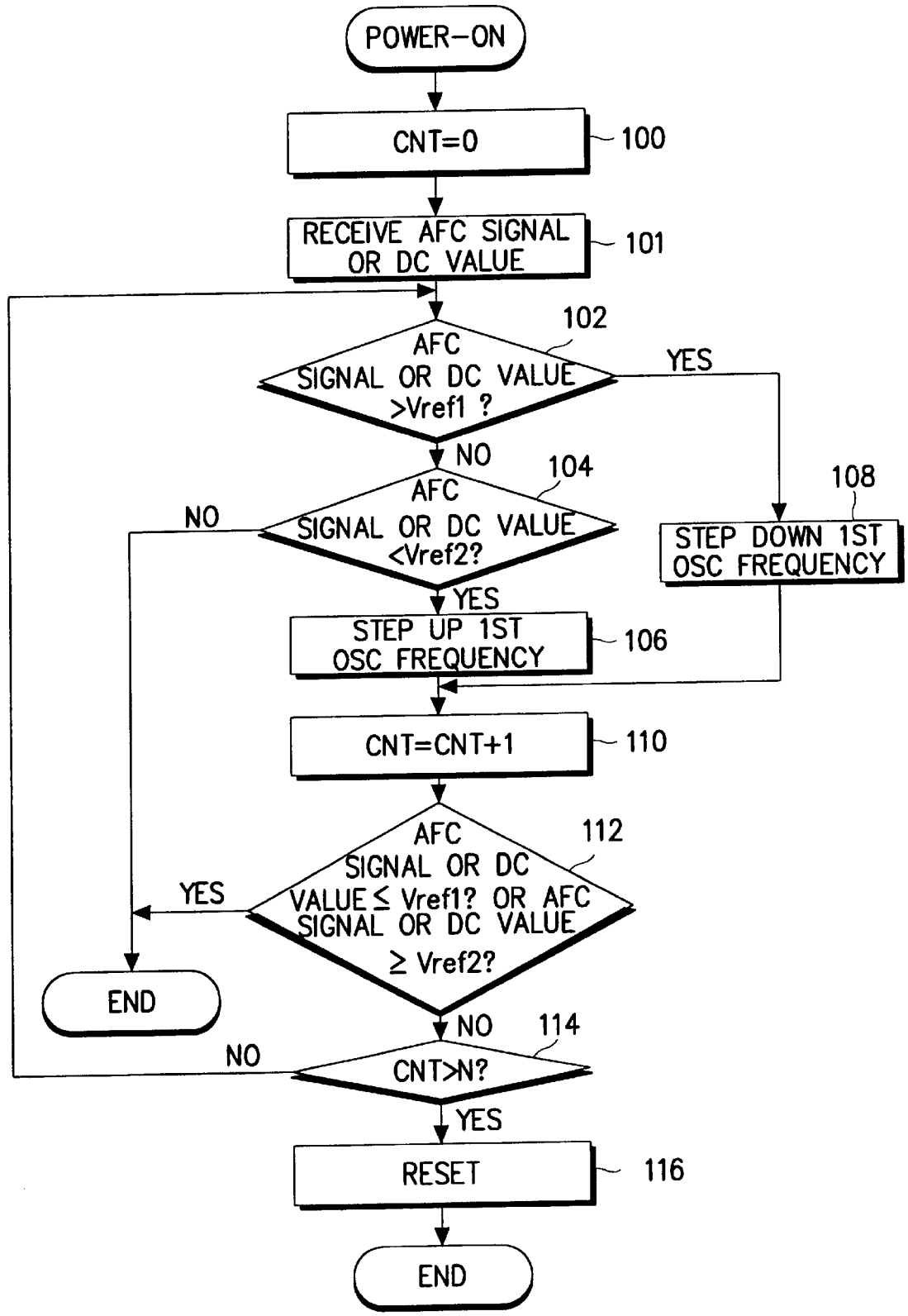
FIG. 5 is a flow chart of a carrier frequency error reduction algorithm according to an embodiment of the present invention.

Referring to FIG. 5, upon power-up, the microprocessor 34 initializes, at a step 100, a counter to set a count value CNT to zero whenever the first local oscillator 46 in the double conversion tuner 12 changes the first local oscillation frequency step by step. At a step 101, the microprocessor 34 receives the AFC signal or the DC component of the AFC signal from the automatic phase control low-pass filter 32. The microprocessor 34 compares, at a step 102, the AFC signal or the DC component thereof with the first reference voltage Vref1. The first reference voltage Vref1 corresponds to a voltage at which the frequency offset becomes about 100 kHz. Thus, the value x2 on an x-axis of FIGS. 6 and 7 have the frequency offset of about 100 kHz.

At the step 102, if the AFC signal level or the DC component thereof is higher than the first reference voltage Vref1, it is meant that the pilot signal has the frequency offset at a point P1 as shown in FIG. 6. In this case, the first oscillator 46 in the double conversion tuner 12 changes, at a step 108, the first local oscillation frequency (1 GHz) by one step so as to reduce the frequency error, under the control of the microprocessor 34. That is, with reference to FIG. 8, the first local oscillation frequency will be increased by one step. In accordance with the present invention, the unit step frequency is set to 63.5 kHz. Therefore, the first local oscillation frequency generated from the first local oscillator 46 will be 1 GHz+63.5 kHz.

However, at the step 102, if the AFC signal level or the DC component thereof is lower than the first reference voltage Vref1, the microprocessor 34 will check, at a step 104, whether or not the AFC signal level or the DC component thereof is lower than the second reference voltage Vref2. If the AFC signal level or the DC component thereof is lower than the second reference voltage Vref2, it is meant that the pilot signal has the frequency offset at a point P2 as shown in FIG. 6. In that case, the first oscillator 46 in the double conversion tuner 12 changes, at a step 106, the first local oscillation frequency (1 GHz) by one step so as to reduce the frequency error, under the control of the microprocessor 34. That is, with reference to FIG. 8, the first local oscillation frequency will be decreased by one step. Therefore, the first local oscillation frequency generated from the first local oscillator 46 will be 1 GHz−63.5 kHz.

Then, the microprocessor 34 increases the count value CNT by one at a step 110, and checks at a step 112 whether or not the AFC signal or the DC component thereof is equal to or lower than the first reference voltage Vref1, or the AFC signal or the DC component thereof is equal to or higher than the second reference voltage Vref2. If the result of this check is YES, this means that the frequency offset is lower than the value x2 or −x2 shown in FIGS. 6 and 7. Thus, there is no more need to change the first oscillation frequency of the first local oscillator 46. In this case, it is prefer to change the second local oscillation frequency of the second local oscillator 58. Since the second local oscillator 58 is controlled by the carrier recovery circuit 36 as shown in FIGS. 1 and 2, the microprocessor 34 ends the procedure.

However, at the step 112, if the result of the check is NO, this means that the frequency offset falls within the speed response pull-in ranges −x1~−x2 and x1~x2 shown in FIGS. 6 and 7. In this case, the microprocessor 34 checks, at a step 114, whether or not the count value CNT is greater than a predetermined value N. If the count value CNT is not greater than the predetermined value N, the procedure will return to the step 102 and repeat the succeeding steps to recover the carrier. If, however, the count value CNT is greater than a predetermined value N, the microprocessor will reset the system at a step 116.

Figure 3:
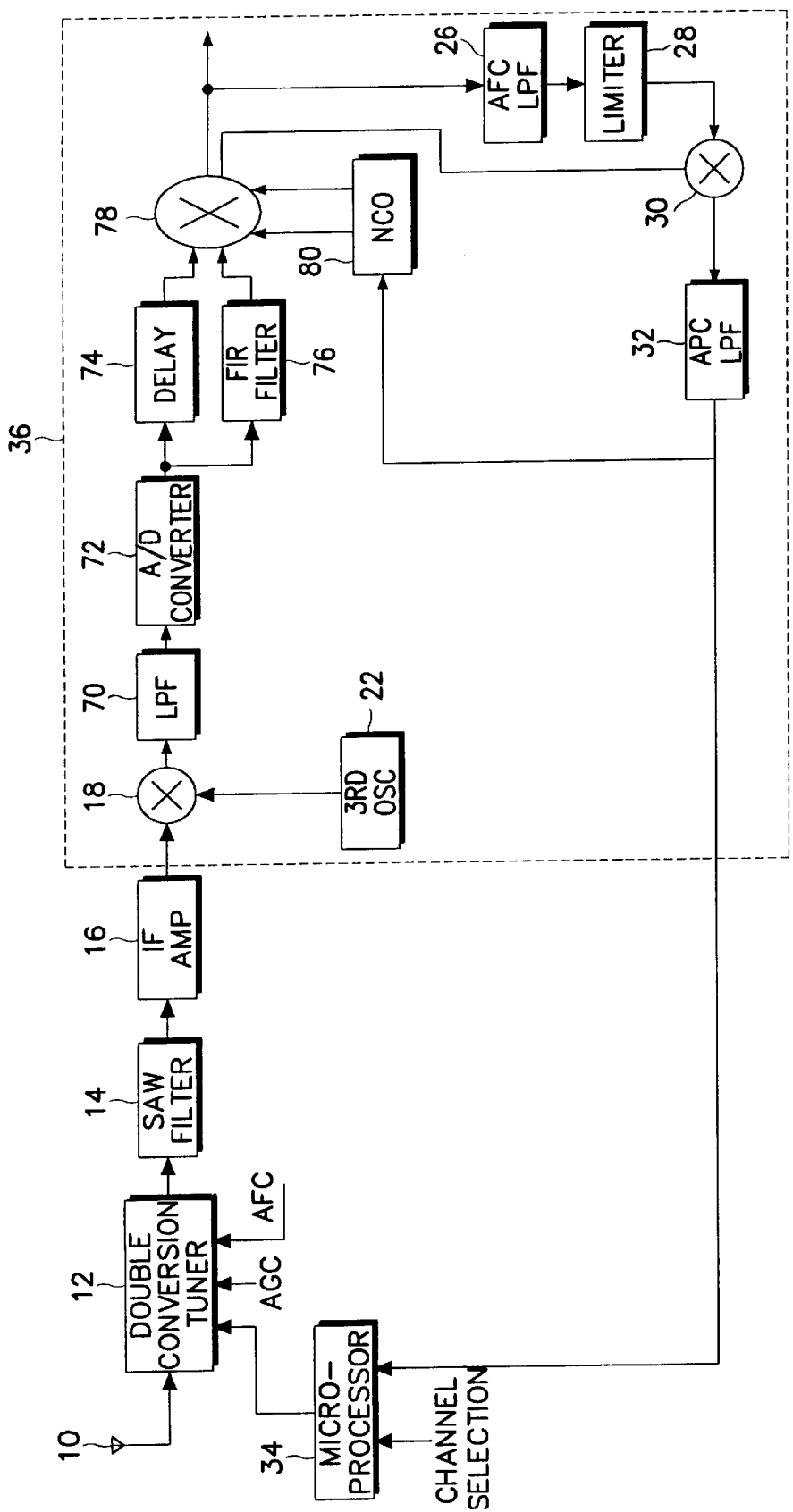
FIG. 3 is a block diagram of an HDTV with a digital carrier recovery circuit according to another embodiment of the present invention.

FIG. 3 illustrates an HDTV receiver with a digital carrier recovery circuit 36 according to another embodiment of the present invention, in which the carrier recovery circuit 36 is fully composed of digital elements. As illustrated, a minimization of the carrier offset is achieved by controlling a frequency of a numerically controlled oscillator (NCO) 80. Therefore, the second local oscillator 58 is controlled by the DC voltage. The intermediate frequency signal (44 MHz) generated from the IF amplifier 16 is mixed by the mixer 18 with the third local oscillation frequency from the third local oscillator 22. Thus, intermediate frequency is down-converted into the base band frequency. An output of the mixer 18 is low-pass-filtered by a low-pass filter 70, and converted into a digital signal by an analog-to-digital converter 72. The digital signal output from the analog-to-digital converter 72 is filtered by a finite impulse response (FIR) filter 76, thereby generating an imaginary component of the received signal. A delay 74 delays the digital signal output from the analog-to-digital converter 72 to compensate for the time delay of the FIR filter 76, and generates the real component. A multiplier 78 multiplies the complex signal composed of the real component and the imaginary component by a local oscillation signal generated from the NCO 80. Further, in a similar manner as shown in FIG. 3, the carrier is recovered by the automatic frequency control low-pass filter 26, the limiter 28, the multiplier 30, and the automatic phase control low-pass filter 32.

Here, the automatic phase control low-pass filter 32 receives a frequency difference between the pilot signal input and the local oscillation frequency from the NCO 80. The automatic phase control low-pass filter 32 has the configuration as shown in FIG. 4.

As can be appreciated from the foregoing descriptions, the HDTV receiver with the carrier recovery circuit first determines the frequencies of speed response pull-in ranges at which the frequency offset of the carrier can be rapidly removed. If the detected frequency offset falls within the speed response pull-in frequency range, the first local oscillator in the double conversion tuner changes the local oscillation frequency step-by-step, so as to speedily remove (or minimize) the frequency offset.

Although a preferred embodiment of the present invention has been described in detail above, it will be understood that many variations and/or modifications of the basic inventive concepts herein taught which may appear to those skilled in the art will still fall within the spirit and scope of the present invention as defined in the appended claims.

What is claimed is:

1. A method for reducing a carrier recovery time in a high definition television receiver which has a double conversion tuner and a carrier recovery circuit for recovering a carrier, the method comprising the steps of:

determining, via the carrier recovery circuit, a speed response frequency pull-in range within which a frequency offset can be removed during detection of a pilot signal; and changing step-by-step a first local oscillation frequency of said double conversion tuner as to minimize a detected frequency offset, if the frequency offset falls within the speed response frequency pull-in range determined by the carrier recovery circuit.

2. The method for reducing a carrier recovery time according to claim 1, wherein said speed response frequency pull-in range has a frequency offset of at least 100 kHz.

3. The method for reducing a carrier recovery time according to claim 2, wherein said speed response frequency pull-in range is limited to have a maximum no greater than a maximum of a pull-in range characteristic of the carrier recovery circuit.

4. The method for reducing a carrier recovery time according to claim 2, wherein a unit step of changing the first local oscillation signal is 63.5 kHz.

5. The method for reducing a carrier recovery time according to claim 4, wherein a microprocessor controls the double conversion tuner in response to an output from said carrier recovery circuit.

6. A method for reducing a carrier recovery time in a high definition television receiver which includes a double conversion tuner and a carrier recovery circuit for recovering a carrier, the method comprising the steps of:

(a) checking whether an output of the carrier recovery circuit is higher than a first reference voltage or lower than a second reference voltage;

(b) changing step-by-step a first local oscillation frequency of said double conversion tuner so as to minimize a frequency offset, if the output of said carrier recovery circuit is higher than a first reference voltage or lower than a second reference voltage; and (c) resetting the carrier recovery circuit if the output of said carrier recovery circuit is not higher than the first reference voltage and is not lower than a second reference voltage even though said step (b) has been repeated a predetermined number of times.

7. The method for reducing a carrier recovery time according to claim 6, wherein said step (b) comprises the steps of:

(b1) increasing the first local oscillation frequency by one step if the output of the carrier recovery circuit is higher than said first reference voltage; and (b2) decreasing the first local oscillation frequency by one step if the output of the carrier recovery circuit is lower than said second reference voltage.

8. The method for reducing a carrier recovery time according to claim 7, wherein said first reference voltage corresponds to a frequency offset in a positive direction, and said second reference voltage corresponds to a frequency offset in a negative direction.

9. The method for reducing a carrier recovery time according to claim 8, wherein the absolute value of said first reference voltage is substantially the same as the absolute value of said second reference voltage.

10. The method for reducing a carrier recovery time according to claim 7, wherein the magnitude of frequency step increase in said step (b1) and the magnitude of frequency step decrease in said step (b2) of changing the first local oscillation signal is about 63.5 kHz.

* * * * *